US012626123B2

(12) United States Patent
Cassirer

(10) Patent No.: US 12,626,123 B2
(45) Date of Patent: May 12, 2026

(54) CONTROLLING OPERATION OF ACTOR AND LEARNER COMPUTING UNITS BASED ON A USAGE RATE OF A REPLAY MEMORY

(71) Applicant: GDM Holding LLC, Mountain View, CA (US)

(72) Inventor: Albin Rasmus Cassirer, London (GB)

(73) Assignee: GDM Holding LLC, Mountain View, CA (US)

( * ) Notice: Subject to any disclaimer, the term of this patent is extended or adjusted under 35 U.S.C. 154(b) by 1378 days.

(21) Appl. No.: 17/320,098

(22) Filed: May 13, 2021

(65) Prior Publication Data

US 2022/0366235 A1     Nov. 17, 2022

(51) Int. Cl.
*G06N 3/08* (2023.01)

(52) U.S. Cl.
CPC ..................................... *G06N 3/08* (2013.01)

(58) Field of Classification Search
CPC .......... G06N 3/045; G06N 3/006; G06N 3/08; G06N 3/092; G06N 3/088; G06N 3/047; G06N 3/098; G06N 3/084; G06N 3/044; G06N 7/01; G06N 3/04; G06N 20/00; G06N 3/094; G06N 3/063; G06N 3/0442; G06N 3/0464; G06N 3/049; G06N 3/0895
See application file for complete search history.

(56) References Cited

U.S. PATENT DOCUMENTS

| | | | |
|---|---|---|---|
| 2017/0228662 A1* | 8/2017 | Gu | G06N 3/045 |
| 2019/0244099 A1* | 8/2019 | Schaul | G06N 3/044 |

OTHER PUBLICATIONS

"Relational Deep Reinforcement Learning" Zambaldi et al (Year: 2018).*
Abadi et al., "Tensorflow: A system for large-scale machine learning," 12th USENIX symposium on operating systems design and implementation, Nov. 2016, 21 pages.
Berner et al., "Dota 2 with large scale deep reinforcement learning," Open AI, arXiv preprint arXiv:1912.06680, Dec. 2019, 66 pages.
Cassirer et al., "Reverb: A Framework for Experience Replay," Machine Learning, arXiv preprint arXiv:2102.04736, Feb. 2021, 11 pages.

(Continued)

*Primary Examiner* — Luis A Sitiriche
(74) *Attorney, Agent, or Firm* — Fish & Richardson P.C.

(57) ABSTRACT
Methods, systems, and apparatus, including computer programs encoded on a computer storage medium, for training an action selection neural network used to select actions to be performed by an agent to interact with an environment. In one aspect, a system comprises: a plurality of actor computing units; a replay memory that stores trajectories generated by the plurality of actor computing units; one or more learner computing units; and a control subsystem that is configured to perform operations comprising: determining a usage rate of the replay memory; and in response to determining that the usage rate of the replay memory is outside a range of allowable usage rates: preventing each of one or more of the actor computing units from generating trajectories, or preventing each of one or more of the learner computing units from sampling trajectories from the replay memory for use in training the action selection neural network.

20 Claims, 6 Drawing Sheets

(56)          References Cited

OTHER PUBLICATIONS

Espeholt et al., "Impala: Scalable distributed deep-rl with importance weighted actor-learner architectures," International Conference on Machine Learning, Jul. 2018, 10 pages.

Espeholt et al., "Seed rl: Scalable and efficient deep-rl with accelerated central inference," Published as a Conference Paper at ICLR, arXiv preprint arXiv:1910.06591, Oct. 2019, 20 pages.

Fedus et al., "Revisiting fundamentals of experience replay," International Conference on Machine Learning, Nov. 2020, 11 pages.

Frostig et al., "Compiling machine learning programs via high-level tracing," Systems for Machine Learning, Dec. 2018, 3 pages.

Fu et al., "Diagnosing bottlenecks in deep q-learning algorithms," International Conference on Machine Learning, May 2019, 10 pages.

GitHub.com [online], "DeepMind/ACME," Sep. 2020, retrieved on May 17, 2021, retrieved from URL<https://github.com/deepmind/acme/blob/af5450c3f93ff8f5ca909280942b37879fd45493/acme/agents/tf/d4pg/agent.py##L96.>, 4 pages.

GitHub.com [online], "mhe500/tf-agents," 2018, retrieved on May 17, 2021, retrieved from URL<https://github.com/mhe500/tf-agents>, 3 pages.

GitHub.com [online], "pcchenxi/stable-baselines," 2018, retrieved on May 17, 2021, retrieved from URL<https://github.com/pcchenxi/stable-baselines>, 3 pages.

GitHub.com [online], "rlworkgroup/garage," Sep. 2020, retrieved on May 17, 2021, retrieved from URL<https://github.com/rlworkgroup/garage>, 6 pages.

GitHub.com [online], "TensorFlow/Agents," Dec. 2020, retrieved on May 17, 2021, retrieved from URL<https://github.com/tensorflow/agents/blob/2d5eff4b50d0381b39a5edf6fbaba2614be84682/tf_agents/experimental/distributed/examples/sac/sac_reverb_server.py##L100>, 4 pages.

GitHub.com [online], "thu-ml/tianshou," Apr. 2021, retrieved on May 17, 2021, retrieved from URL<https://github.com/thu-ml/tianshou>, 10 pages.

Gruslys et al., "The reactor: A fast and sample-efficient actor-critic agent for reinforcement learning," Published as a Conference Paper at ICLR, arXiv preprint arXiv:1704.04651, Apr. 2017, 18 pages.

Haarnoja et al., "Soft actor-critic: Off-policy maximum entropy deep reinforcement learning with a stochastic actor," International Conference on Machine Learning, Jul. 2018, 10 pages.

Hoffman et al., "Acme: A research framework for distributed reinforcement learning," DeepMind, arXiv preprint arXiv:2006.00979, Jun. 2020, 33 pages.

Horgan et al., "Distributed prioritized experience replay," Published as a Conference Paper at ICLR, arXiv preprint arXiv:1803.00933, Mar. 2018, 19 pages.

Liang et al., "RLlib: Abstractions for distributed reinforcement learning," International Conference on Machine Learning, Jul. 2018, 10 pages.

Lillicrap et al., "Continuous control with deep reinforcement learning," Published as a Conference Paper at ICLR, arXiv preprint arXiv:1509.02971, Sep. 2015, 14 pages.

Lin et al., "Self-improving reactive agents based on reinforcement learning, planning and teaching," Machine Learning, May 1992, 29 pages.

Mnih et al., "Human-level control through deep reinforcement learning," Nature Letter, Feb. 2015, 13 pages.

Schaul et al., "Prioritized experience replay," Published as a Conference Paper at ICLR, arXiv preprint arXiv:1511.05952, Nov. 2015, 21 pages.

Schulman et al., "Proximal policy optimization algorithms," Open AI, arXiv preprint arXiv:1707.06347, Jul. 2017, 12 pages.

Silver et al., "Mastering the game of Go with deep neural networks and tree search," Nature, Jan. 2016, 20 pages.

Vinyals et al., "Grandmaster level in StarCraft II using multi-agent reinforcement learning," Nature, Nov. 2019, 22 pages.

Yazdanbakhsh et al., "Menger: Massively Large-Scale Distributed Reinforcement Learning with Menger," Google AI Blog, Oct. 2020, 6 pages.

* cited by examiner

TRAINING SYSTEM 200

600

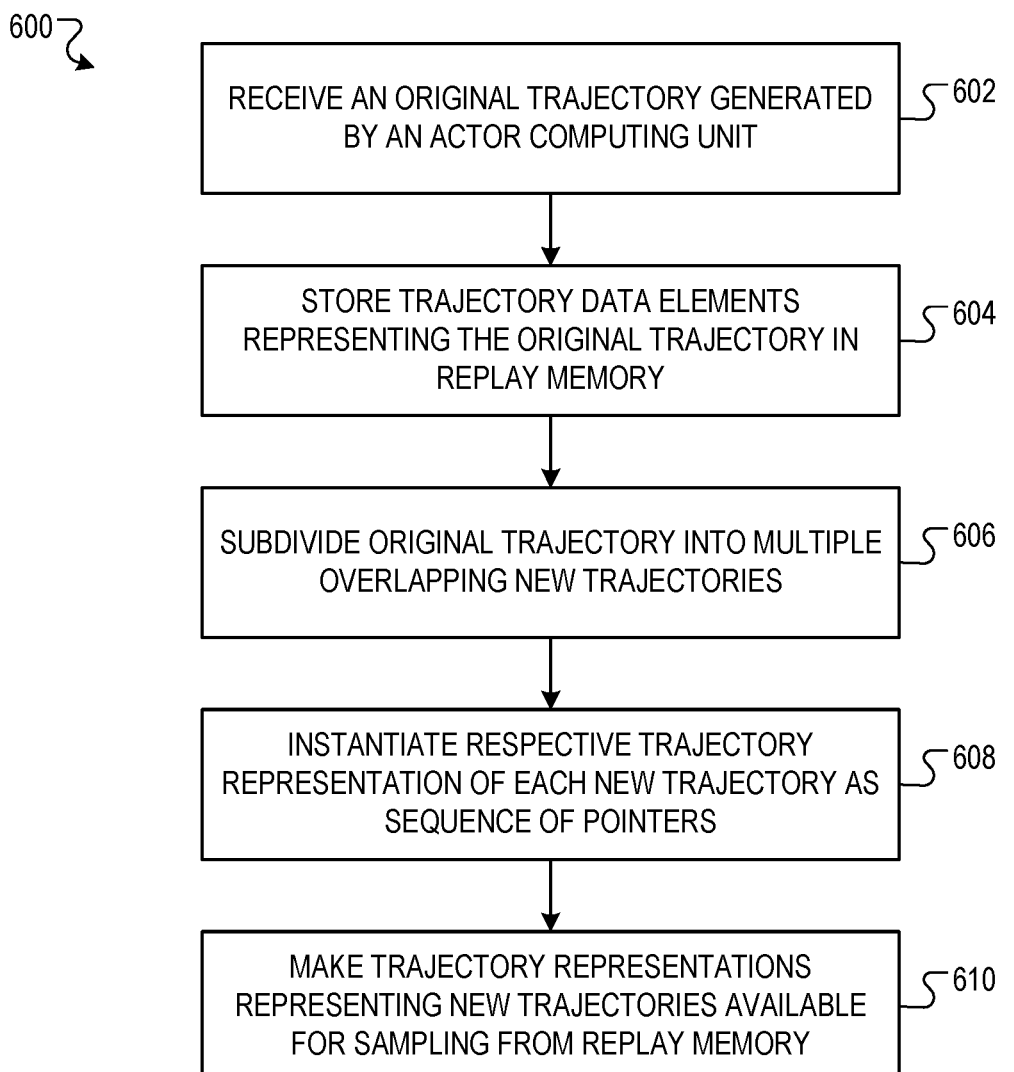

RECEIVE AN ORIGINAL TRAJECTORY GENERATED BY AN ACTOR COMPUTING UNIT ⎰ 602

STORE TRAJECTORY DATA ELEMENTS REPRESENTING THE ORIGINAL TRAJECTORY IN REPLAY MEMORY ⎰ 604

SUBDIVIDE ORIGINAL TRAJECTORY INTO MULTIPLE OVERLAPPING NEW TRAJECTORIES ⎰ 606

INSTANTIATE RESPECTIVE TRAJECTORY REPRESENTATION OF EACH NEW TRAJECTORY AS SEQUENCE OF POINTERS ⎰ 608

MAKE TRAJECTORY REPRESENTATIONS REPRESENTING NEW TRAJECTORIES AVAILABLE FOR SAMPLING FROM REPLAY MEMORY ⎰ 610

FIG. 6

CONTROLLING OPERATION OF ACTOR AND LEARNER COMPUTING UNITS BASED ON A USAGE RATE OF A REPLAY MEMORY

BACKGROUND

This specification relates to processing data using machine learning models.

Machine learning models receive an input and generate an output, e.g., a predicted output, based on the received input. Some machine learning models are parametric models and generate the output based on the received input and on values of the parameters of the model.

Some machine learning models are deep models that employ multiple layers of models to generate an output for a received input. For example, a deep neural network is a deep machine learning model that includes an output layer and one or more hidden layers that each apply a non-linear transformation to a received input to generate an output.

SUMMARY

This specification describes a training system implemented as computer programs on one or more computers in one or more locations that trains an action selection neural network used to control an agent that is interacting with an environment.

As used throughout this specification, a computing unit may be, e.g., a computer, a core within a computer having multiple cores, or other hardware or software, e.g., a dedicated thread, within a computer capable of independently performing operations. The computing units may include processor cores, processors, microprocessors, special-purpose logic circuitry, e.g., an FPGA (field-programmable gate array) or an ASIC (application-specific integrated circuit), or any other appropriate computing units. In some examples, the computing units are all the same type of computing unit. In other examples, the computing units may be different types of computing units. For example, one computing unit may be a central processing unit (CPU) while other computing units may be graphics processing units (GPUs).

As used throughout this specification, a trajectory refers to data characterizing interaction of an agent with an environment over a sequence of one or more time steps. More specifically, for each time step in a sequence of time steps, a trajectory can represent: (i) an observation characterizing the state of the environment at the time step, (ii) an action performed by the agent at the time step, and (iii) a reward received at the time step. A trajectory can represent other data as well, e.g., a discount factor for each time step, a state of an action selection neural network being used to control the agent at each time step (e.g., where the state can be a hidden state of a recurrent action selection neural network, e.g., a cell state of a long short-term memory (LSTM) network), or both.

As used throughout this specification, a "memory," e.g., a replay memory, can be a physical data storage device or a logical data storage area.

As used throughout this specification, a "reinforcement learning technique" can refer to any appropriate reinforcement learning training technique, e.g., a Q learning technique or a policy gradient technique. Training an action selection neural network using a reinforcement learning technique can refer to backpropagating gradients of a reinforcement learning objective function through the action selection neural network to adjust the parameter values of the action selection neural network. Training an action selection neural network using a reinforcement learning technique can increase a cumulative measure of rewards (e.g., a time-discounted sum of rewards) received by an agent by performing actions selected using the action selection neural network.

According to one aspect there is provided a system for training an action selection neural network used to select actions to be performed by an agent to interact with an environment, the system comprising: a plurality of actor computing units, wherein each actor computing unit is configured to control interaction of a respective instance of the agent with a respective instance of the environment to generate trajectories for use in training the action selection neural network; a replay memory that stores trajectories generated by the plurality of actor computing units; one or more learner computing units, wherein each learner computing unit is configured to train the action selection neural network on trajectories selected from the replay memory; and a control subsystem that is configured to: determine a usage rate of the replay memory characterizing how frequently trajectories from the replay memory have been sampled for use in training the action selection neural network; and in response to determining that the usage rate of the replay memory is outside a range of allowable usage rates: prevent each of one or more of the actor computing units from generating trajectories, or prevent each of one or more of the learner computing units from sampling trajectories from the replay memory for use in training the action selection neural network.

In some implementations, determining the usage rate of the replay memory characterizing how frequently trajectories from the replay memory have been sampled for use in training the action selection neural network comprises: determining the usage rate of the replay memory based on: (i) a respective number of times that each trajectory that has been stored in the replay memory has been sampled by learner computing unit for use in training the action selection neural network, and (ii) a number of trajectories that have been stored in the replay memory.

In some implementations, determining the determining the usage rate of the replay memory based on: (i) a respective number of times that each trajectory that has been stored in the replay memory has been sampled by the learner computing units for use in training the action selection neural network, and (ii) a number of trajectories that have been stored in the replay memory, comprises: determining the usage rate of the replay memory based on a ratio between: (i) a sum of the respective number of times that each trajectory that has been stored in the replay memory has been sampled by the learner computing units for use in training the action selection neural network, and (ii) the number of trajectories that have been stored in the replay memory.

In some implementations, the control subsystem is configured to: determine that the usage rate of the replay memory is outside the range of allowable usage rates based on the usage rate of the replay memory being below a lower endpoint of the allowable range of usage rates; and prevent each of one or more of the actor computing units from generating trajectories.

In some implementations, determining the usage rate of the replay memory characterizing how frequently trajectories from the replay memory have been sampled for use in training the action selection neural network comprises: receiving a request from an actor computing unit to store one or more trajectories generated by the actor computing unit in the replay memory; and determining the usage rate of the replay memory as a usage rate that would result from storing the one or more trajectories generated by the actor computing unit in the replay memory.

In some implementations, the control subsystem is configured to: prevent the actor computing unit from storing the one or more trajectories generated by the actor computing unit the replay memory.

In some implementations, the control subsystem is configured to: determining that the usage rate of the replay memory is outside the range of allowable usage rates based on the usage rate of the replay memory being above an upper endpoint of the allowable range of usage rates; and preventing each of one or more of the learner computing units from sampling trajectories from the replay memory for use in training the action selection neural network.

In some implementations, determining the usage rate of the replay memory characterizing how frequently trajectories from the replay memory have been sampled for use in training the action selection neural network comprises: receiving a request from a learner computing unit to sample one or more trajectories from the replay memory; and determining the usage rate of the replay memory as a usage rate that would result from the learner computing unit sampling the one or more trajectories from the replay memory.

In some implementations, the control subsystem is configured to: determining that the usage rate of the replay memory is outside the range of allowable usage rates based on the usage rate of the replay memory being below a lower endpoint of the allowable range of usage rates; and determining that one or more learner computing units that were previously prevented from sampling trajectories from the replay memory for use in training the action selection neural network should resume sampling trajectories from the replay memory for use in training the action selection neural network.

In some implementations, the control subsystem is configured to: determining that the usage rate of the replay memory is outside the range of allowable usage rates based on the usage rate of the replay memory being above an upper endpoint of the allowable range of usage rates; and determining that one or more actor computing units that were previously prevented from generating trajectories should resume generating trajectories.

In some implementations, the system comprises at least one hundred actor computing units.

In some implementations, the control subsystem continuously monitors the usage rate of the replay memory to maintain the usage rate of the replay memory within the range of allowable usage rates.

In some implementations, the system further comprises a memory management subsystem that is configured to: receive an original trajectory generated by an actor computing unit; store a plurality of trajectory data elements representing the original trajectory in respective slots of the replay memory; subdivide the original trajectory into a plurality of overlapping new trajectories; instantiate a respective trajectory representation of each new trajectory in the replay memory as a sequence of pointers that each point to a respective slot of the replay storing a trajectory data element of the original trajectory; and make each of the trajectory representations representing the new trajectories available to the learner computing units for sampling from the replay memory.

In some implementations, each of the plurality of trajectory data elements representing the original trajectory corresponds to a respective time step in the original trajectory and includes data representing interaction of an agent with an environment at the time step.

In some implementations, each of the plurality of trajectory data elements includes data representing: (i) an observation of the environment at the corresponding time step, (ii) an action performed by the agent at the corresponding time step, and (iii) a reward received by the agent at the corresponding time step.

In some implementations, storing the plurality of trajectory data elements representing the original trajectory in respective slots in the replay memory comprises: compressing each of the plurality of trajectory data elements.

In some implementations, the memory management subsystem is configured to: track, for each trajectory data element stored in the replay memory, a respective number of times that a slot storing the trajectory data element is referenced by pointers from trajectory representations stored in the replay memory; and determine that one or more of the trajectory data elements stored in the replay memory should be removed from the replay memory based on the number of times that the slot storing the trajectory data element is referenced by pointers from trajectory representations stored in the replay memory.

In some implementations, determining that one or more of the trajectory data elements stored in the replay memory should be removed from the replay memory comprises: determining that any trajectory data element that is not referenced by any pointers from trajectory representations stored in the replay memory should be removed from the replay memory.

According to another aspect there is provided a method performed by one or more data processing apparatus that implements the operations of the systems described herein.

According to another aspect there are provided one or more non-transitory computer storage media storing instructions that when executed by one or more computers cause the one or more computers to perform operations to implement the systems described herein.

Particular embodiments of the subject matter described in this specification can be implemented so as to realize one or more of the following advantages.

This specification describes a training system for training an action selection neural network that is used to control an agent interacting with an environment. The training system includes one or more actor computing units (potentially numbering in the hundreds or the thousands) that are each configured to control a respective instance of an agent interacting with a respective instance of an environment to generate trajectories for training the action selection neural network. The training system stores the trajectories generated by the actor computing units in a replay memory, and uses one or more learner computing units to sample trajectories from the replay memory and train the action selection neural network on the sampled trajectories.

During training, the training system autonomously monitors a "usage rate" of the replay memory, representing how frequently the trajectories in the replay memory have been sampled for use in training the action selection neural network. The training system dynamically controls the operation of the actor and learner computing units to cause the usage rate of the replay memory to remain within an allowable range of usage rates (e.g., that is specified by a user). Maintaining the usage rate of the replay memory within the range of allowable usage rates can reduce consumption of computational resources (e.g., memory and computing power) by the training system while increasing the performance of the action selection neural network.

For example, the usage rate of the replay memory being below the lower endpoint of the allowable range of usage rates can indicate that the trajectories being stored in the replay memory are being underutilized by the learner computing units. Put another way, the actor computing units may be generating a wastefully large number of trajectories that may be overwhelming the capacity of the learner computing units to fully use the generated trajectories during training of the action selection neural network. In this instance, the training system can "block" one or more actor computing units (possibly all of the actor computing units), i.e., by preventing the blocked actor computing units from generating new trajectories. The training system can thus reduce the number of generated trajectories without necessarily reducing the rate at which the action selection neural network can be trained to reach an acceptable level of performance. Moreover, by blocking one or more actor computing units, the training system can reduce the consumption of computational resources during training of the action selection neural network and free up computing resources for other purposes.

As another example, the usage rate of the replay memory being above the upper endpoint of the allowable range of usage rates can indicate that the trajectories being stored in the replay memory are being over-utilized by the learner computing units. In particular, the learner computing units may be repeatedly training the action selection neural network on the same trajectories from the replay memory until the action selection neural network "over-fits" those trajectories. Over-fitting the trajectories in the replay memory can decrease the performance of an agent being controlled by the action selection neural network in performing a task, e.g., by causing the action selection neural network to "forget" previously learned information in favor of "memorizing" the current contents of the replay memory. In this instance, the training system can block one or more of the learner computing units (possibly all of the learner computing units), i.e., by preventing the blocked learner computing units from sampling trajectories from the replay memory for use in training the action selection neural network. The training system can thus reduce consumption of computational resources (i.e., by preventing the blocked learner computing units from operating), and also improve the performance of the action selection neural network (e.g., by reducing over-fitting).

Conventional training systems that use replay memories that operate without the benefit of the techniques described in this specification can suffer from over-fitting, consuming more computational resources than necessary for effective training of an action selection neural network, or both. These issues affecting conventional systems can be exacerbated, e.g., when actor or learner computing units are taken offline due to hardware or software failures, or when actor or learner computing units are re-tasked to perform other computing operations that are assigned a higher priority. On the other hand, the training system described in this specification, by autonomously monitoring the usage rate of the replay memory and causing it to remain within an allowable range of usage rates, can reduce the likelihood of overfitting and optimize the use of computational resources.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

FIG. 6 is a flow diagram of an example process for representing a trajectory generated by an actor computing unit in a replay memory.

Like reference numbers and designations in the various drawings indicate like elements.

DETAILED DESCRIPTION

This specification describes a training system for training an action selection neural network that is used by an action selection system to select actions to be performed by an agent to interact with an environment. An example of an action selection system is described in more detail with reference to FIG. 1, and an example of a training system is described in more detail with reference to FIG. 2.

Figure 1:
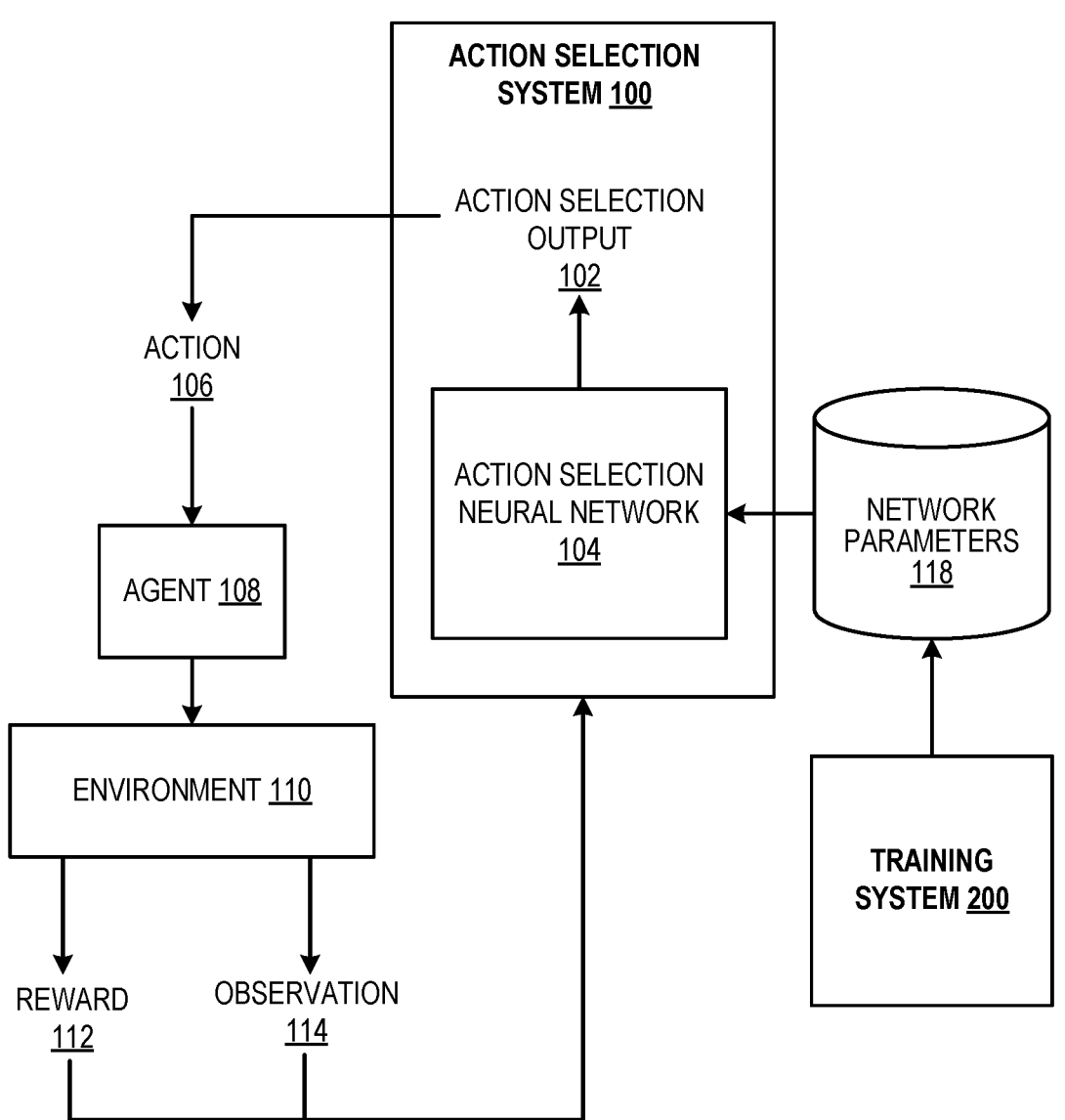
FIG. 1 is a block diagram that shows an example action selection system.

FIG. 1 is a block diagram that shows an example action selection system 100. The action selection system 100 is an example of a system implemented as computer programs on one or more computers in one or more locations in which the systems, components, and techniques described below are implemented.

The action selection system 100 selects actions 106 to be performed by an agent 108 interacting with an environment 110 at each of multiple time steps to accomplish a goal. At each time step, the system 100 receives data characterizing the current state of the environment 110, e.g., an image of the environment 110, and selects an action 106 to be performed by the agent 108 in response to the received data. Data characterizing a state of the environment 110 will be referred to in this specification as an observation 114. At each time step, the state of the environment 110 at the time step (as characterized by the observation 114) depends on the state of the environment 110 at the previous time step and the action 106 performed by the agent 108 at the previous time step.

At each time step, the system 100 may receive a reward 112 based on the current state of the environment 110 and the action 106 of the agent 108 at the time step. Generally, the reward 112 may be represented a numerical value. The reward 112 can be based on any event in or aspect of the environment 110. For example, the reward 112 may indicate whether the agent 108 has accomplished a goal (e.g., navigating to a target location in the environment 110) or the progress of the agent 108 towards accomplishing a goal.

In some implementations, the environment is a real-world environment and the agent is a mechanical agent interacting with the real-world environment. For example, the agent may be a robot interacting with the environment to accomplish a goal, e.g., to locate an object of interest in the environment, to move an object of interest to a specified location in the environment, to physically manipulate an object of interest in the environment in a specified way, or to navigate to a specified destination in the environment; or the agent may be an autonomous or semi-autonomous land, air, or sea vehicle navigating through the environment to a specified destination in the environment.

In these implementations, the observations may include, for example, one or more of images, object position data, and sensor data to capture observations as the agent interacts with the environment, for example sensor data from an image, distance, or position sensor or from an actuator.

For example, in the case of a robot, the observations may include data characterizing the current state of the robot, e.g., one or more of: joint position, joint velocity, joint force, torque or acceleration, for example gravity-compensated torque feedback, and global or relative pose of an item held by the robot.

In the case of a robot or other mechanical agent or vehicle the observations may similarly include one or more of the position, linear or angular velocity, force, torque or acceleration, and global or relative pose of one or more parts of the agent. The observations may be defined in 1, 2 or 3 dimensions, or any other appropriate number of dimensions, and may be absolute and/or relative observations.

The observations may also include, for example, data obtained by one of more sensor devices which sense a real-world environment; for example, sensed electronic signals such as motor current or a temperature signal; and/or image or video data for example from a camera or a LIDAR sensor, e.g., data from sensors of the agent or data from sensors that are located separately from the agent in the environment.

In the case of an electronic agent the observations may include data from one or more sensors monitoring part of a plant or service facility such as current, voltage, power, temperature and other sensors and/or electronic signals representing the functioning of electronic and/or mechanical items of equipment.

The actions may be control inputs to control a robot, e.g., torques for the joints of the robot or higher-level control commands, or the autonomous or semi-autonomous land or air or sea vehicle, e.g., torques to the control surface or other control elements of the vehicle or higher-level control commands.

In other words, the actions can include for example, position, velocity, or force/torque/acceleration data for one or more joints of a robot or parts of another mechanical agent. Actions may additionally or alternatively include electronic control data such as motor control data, or more generally data for controlling one or more electronic devices within the environment the control of which has an effect on the observed state of the environment. For example, in the case of an autonomous or semi-autonomous land, air, or sea vehicle, the actions may include actions to control navigation e.g., steering, and movement e.g., braking and/or acceleration of the vehicle.

In some implementations the environment is a simulated environment and the agent is implemented as one or more computers interacting with the simulated environment.

For example, the simulated environment may be a motion simulation environment, e.g., a driving simulation or a flight simulation, and the agent may be a simulated vehicle navigating through the motion simulation. In these implementations, the actions may be control inputs to control the simulated user or simulated vehicle.

In another example, the simulated environment may be a video game and the agent may be a simulated user playing the video game.

In a further example the simulated environment may be a protein folding environment such that each state is a respective state of a protein chain and the agent is a computer system for determining how to fold the protein chain. In this example, the actions are possible folding actions for folding the protein chain and the goal to be achieved may include, e.g., folding the protein so that the protein is stable and so that it achieves a particular biological function.

Generally, in the case of a simulated environment the observations may include simulated versions of one or more of the previously described observations or types of observations and the actions may include simulated versions of one or more of the previously described actions or types of actions.

In some other applications the agent may control actions in a real-world environment including items of equipment, for example in a data center or grid mains power or water distribution system, or in a manufacturing plant or service facility. The observations may then relate to operation of the plant or facility. For example, the observations may include observations of power or water usage by equipment, or observations of power generation or distribution control, or observations of usage of a resource or of waste production. The agent may control actions in the environment to accomplish the goal of increased efficiency, for example by reducing resource usage, and/or reduce the environmental impact of operations in the environment, for example by reducing waste. The actions may include actions controlling or imposing operating conditions on items of equipment of the plant/facility, and/or actions that result in changes to settings in the operation of the plant/facility e.g., to adjust or turn on/off components of the plant/facility.

In some further applications, the environment is a real-world environment and the agent manages distribution of tasks across computing resources, e.g., on a mobile device and/or in a data center. In these implementations, the actions may include assigning tasks to particular computing resources, and the goal to be achieved can include minimizing the time required to complete a set of tasks using specified computing resources.

As a further example, the actions may include presenting advertisements, the observations may include advertisement impressions or a click-through count or rate, and the reward may characterize previous selections of items or content taken by one or more users. In this example, the goal to be achieved can include maximizing selections of item or content by the one or more users.

Optionally, in any of the above implementations, the observation at any given time step may include data from a previous time step that may be beneficial in characterizing the environment, e.g., the action performed at the previous time step, the reward received at the previous time step, and so on.

The action selection system 100 selects the action 106 to be performed by the agent 108 at each time step using an action selection neural network 104. More specifically, at each time step, the action selection system 100 provides an input that includes an observation characterizing the current state of the environment at the time step to the action selection neural network 104. The action selection neural network 104 processes the input, in accordance with values of a set of action selection neural network parameters 118, to generate an action selection output 102. In some implementations, the action selection output 102 includes a respective score for each action in a set of possible actions that can be performed by the agent. In some other implementations, the action selection output 102 directly defines an action to be performed by the agent, e.g., by defining a respective torque to be applied to each of one or more joints of a robotic agent, or by defining steering and acceleration actions to be performed by an autonomous vehicle agent.

The action selection system 100 selects the action 106 to be performed by the agent 108 at each time step using the action selection output 102 generated by the action selection neural network 104 at the time step. For example, the action selection system 100 can select the action having the highest score, according to the action selection output 102, as the action to be performed by the agent at the time step. In some implementations, the action selection system 100 selects the action to be performed by the agent in accordance with an exploration strategy. For example, the action selection system 100 can use an $\epsilon$-greedy exploration strategy. In this example, the action selection system 100 can select the action having a highest score (according to the action selection output 102) with probability 1-$\epsilon$, and select an action randomly with probability $\epsilon$, where $\epsilon$ is a number between 0 and 1.

The action selection neural network 104 can have any appropriate neural network architecture that enables it to perform its described functions. For example, the action selection neural network can include any appropriate types of neural network layers (e.g., convolutional layers, fully connected layers, attention layers, recurrent layers, e.g., long short-term memory layers, etc.) in any appropriate numbers (e.g., 5 layers, 25 layers, or 125 layers) connected in any appropriate configuration (e.g., as a linear sequence of layers).

For convenience, this specification generally refers to an action selection neural network. More generally, however, any appropriate machine learning model can be used to select actions to be performed by an agent, and can be trained by the training system 200 using any appropriate machine learning techniques. For example, the action selection machine learning model can be implemented, e.g., as a random forest model, a support vector machine model, a linear regression model, or a combination thereof.

The training system 200 trains the network parameters 118 of the action selection neural network 104, e.g., to determine trained valued of the network parameters 118 that enable the action selection system 100 to select actions that cause the agent to effectively perform tasks in the environment 110. More specifically, the training system 200 uses one or more "actor" computing units to control respective instances of agents interacting with respective instances of the environment to generate trajectories for use in training the action selection neural network 104. The training system 200 stores the trajectories generated by the actor computing units in a "replay" memory. In parallel, the training system 200 uses one or more "learner" computing units to sample trajectories from the replay memory and update the network parameters 118 of the action selection neural network 104 based on the sampled trajectories using reinforcement learning techniques.

During training, the training system 200 monitors a "usage rate" of the replay memory, characterizing how frequently the trajectories from the replay memory have been sampled for use in training the action selection neural network 104. The training system 200 dynamically controls the operation of the actor and learner computing units to cause the usage rate of the replay memory to remain within an allowable range of usage rates. Maintaining the usage rate of the replay memory within the allowable range of usage rates can both reduce consumption of computational resources by the training system, and increase the performance of the trained action section neural network, as will be described in more detail below. An example of a training system 200 is described in more detail with reference to FIG. 2.

In some cases, the training system 200 can train the action selection neural network 104 on trajectories generated by simulated instances of agents interacting with simulated instances of the environment. After the training system 200 trains the action selection neural network 104 on the trajectories corresponding to simulated environment interactions, the trained action selection neural network 104 can be used to control interaction of an agent with a real-world environment. Training the action selection neural network based on interactions of the agent with a simulated environment (i.e., instead of a real-world environment) can avoid wear-and-tear on the agent and can reduce the likelihood that, by performing poorly chosen actions, the agent can damage itself or aspects of its environment.

Figure 2:
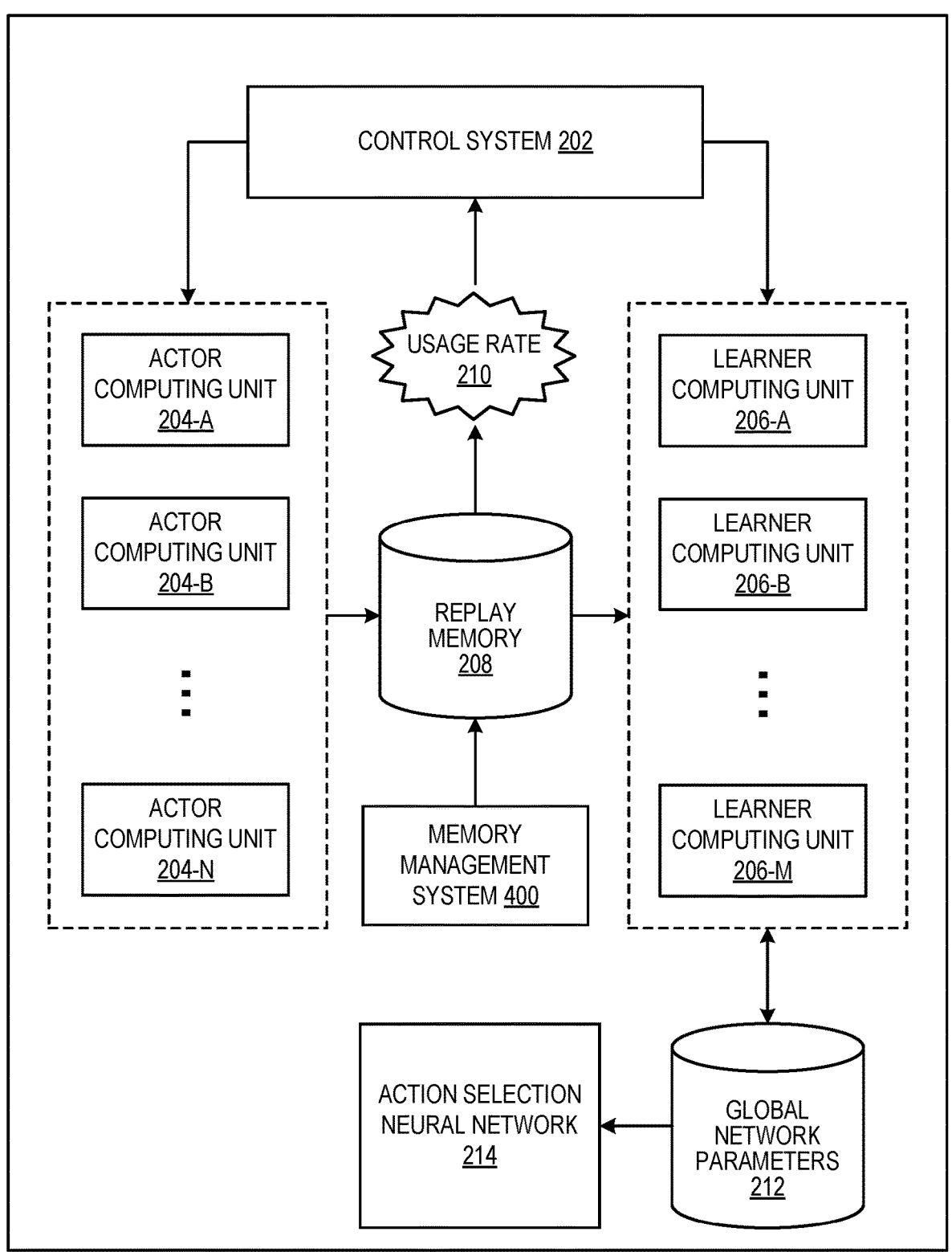
FIG. 2 shows an example training system.

FIG. 2 shows an example training system 200. The training system 200 is an example of a system implemented as computer programs on one or more computers in one or more locations in which the systems, components, and techniques described below are implemented.

The training system 200 trains a set of "global" network parameters 212 of an action selection neural network 214 (e.g., the action selection neural network 104 described with reference to FIG. 1) using reinforcement learning techniques to enable the action selection neural network to select actions to be performed by an agent to effectively accomplish tasks in an environment. An example of an action selection system that uses an action selection neural network to control an agent interacting with an environment is described in more detail with reference to FIG. 1.

The training system 200 includes a set of one or more actor computing units 204-A-204-N, a replay memory 208, a set of one or more learner computing units 206-A-206-M, a control system 202, and a memory management system 400, each of which are described in more detail next.

Each of the actor computing units is configured to control interaction of a respective instance of an agent with a respective instance of an environment to generate trajectories for use in training the global network parameters 212 of the action selection neural network 214. Each "instance" of the agent can be, e.g., a respective simulated agent interacting with a respective simulated environment, or a respective real-world agent interacting with a respective real-world environment.

Each actor computing unit uses a respective action selection system to control a corresponding agent to interact with a corresponding environment, in particular, by selecting a respective action to be performed by the agent at each time step based on an observation of the environment at the time step. At each time step, the agent being controlled by the actor computing unit can receive a respective reward, e.g., characterizing a performance of the agent in accomplishing a task in the environment.

Each actor computing unit can use any appropriate action selection policy to control the interaction of the agent with the environment. For example, each actor computing unit can maintain a respective "actor" action selection neural network having substantially the same neural network architecture as the action selection neural network 214, but with possibly different network parameter values. Using an action selection neural network to select actions to be performed by an agent to interact with an environment is described in more detail with reference to FIG. 1. The training system 200 can periodically update the network parameter values of the actor action selection neural networks maintained by the actor computing units based on the global network parameter values 212, as will be described in more detail below. Each actor computing unit can also implement a respective exploration policy as part of controlling the interaction of the agent with the environment, e.g., each actor computing unit can implement an $\epsilon$-greedy exploration policy (as described above) with a different value of $\epsilon$.

The training system 200 stores the trajectories generated by each actor computing unit in the replay memory 208. A trajectory generated by an actor computing unit can represent the interaction of an agent being controlled by the actor computing unit with an environment over a sequence of multiple time steps. For example, for each time step in a sequence of multiple time steps, a trajectory can represent: (i) an observation characterizing the state of the environment at the time step, (ii) an action performed by the agent at the time step, and (iii) a reward received at the time step.

If the replay memory 208 becomes full, then then training system 200 can store newly generated trajectories in the replay memory 208 by overwriting existing trajectories that are already stored in the replay memory 208, e.g., the oldest (i.e., least recently generated) trajectories stored in the replay memory 208.

The learner computing units 206-A-206-M are configured to train the global network parameters 212 of the action selection neural network 214 using reinforcement learning techniques based on trajectories sampled from the replay memory 208. For example, each learner computing unit can maintain a respective learner action selection neural network having substantially the same architecture as the action selection neural network 214. To update the global network parameters 212, a learner computing unit can set the parameter values of its learner action selection neural network equal to the current values of the global network parameters 212. The learner computing unit can then sample (e.g., randomly sample) one or more trajectories from the replay memory 208, and train the learner action selection neural network on the sampled trajectories using reinforcement learning techniques to update the parameter values of the learner action selection neural network. The learner computing unit can then update the global network parameters 212, e.g., by setting the global network parameters equal to a weighted average of the: (i) the current global network parameters 212, and (ii) the updated parameters of the learner action selection neural network.

The learner computing units can be configured to operate synchronously or asynchronously. In an asynchronous configuration, the learner computing units operate independently of one another in determining updates to the global network parameters 212 of the action selection network 214. In a synchronous configuration, at each of multiple training iterations, the learner computing units determine updates to the global network parameters 212 of the action selection neural network 214 based on the same current global network parameter values 212. The parameter updates generated by each of the learner computing units are jointly applied to the global network parameter values 212 at the end of each training iteration.

The training system 200 can periodically update the network parameter values of the actor action selection neural networks maintained by the actor computing units based on the current global network parameter values 212. For example, the training system 200 can update the network parameter values of an actor action selection neural network being maintained by an actor computing unit whenever the training system determines that an update criterion has been satisfied for the actor action selection neural network. The training system 200 can determine that an update criterion has been satisfied for an actor action selection neural network, e.g., if the actor action selection neural network has controlled agent for more than a threshold number of time steps since its network parameter values were last updated. The threshold number of time steps can be, e.g., 500 time steps, 1000 time steps, or any other appropriate number of time steps.

An actor computing unit can use the current values of the global network parameters 212 to update the current values of its actor action selection network parameters in any appropriate manner. For example, the actor computing unit can replace the current values of its actor action selection network parameters with the current values of the global network parameters. As another example, the actor computing unit can replace the current values of its actor action selection network parameters by a linear combination of the current values of the actor action selection network parameters and the global network parameters.

Using the replay memory 208 can allow the training system 200 to leverage large amounts of agent interaction data generated by a set of actor computing units (e.g., potentially thousands of actor computing units) by maintaining it and making it available to one or more learner computing units. The learner computing units can sample the trajectories stored in the replay memory one or more times for use in training the action selection neural network to learn to select actions that, when performed by an agent, enable the agent to effectively interact with an environment.

The control system 202 is configured to continuously monitor a "usage rate" 210 of the replay memory 208 during the training of the action selection neural network 214. The usage rate 210, which can be represented, e.g., as a numerical value, characterizes how frequently trajectories that have been stored in the replay memory have been sampled (i.e., by learner computing units) for use in training the action selection neural network 214. The control system 202 can determine the usage rate 210 at any given time point based on: (i) a respective number of times that each trajectory that has been stored in the replay memory 208 has been sampled for use in training the action selection neural network 214 as of the time point, and (ii) the number of trajectories that have been stored in the replay memory 208.

For example, the control system 202 can determine the usage rate R as:

$$R = \frac{\sum_{i=1}^{N} s_i}{N} \tag{1}$$

where N is the number of trajectories that have been stored in the replay memory, i indexes the trajectories stored in the replay memory, and $s_i$ is the number of times that trajectory i has been sampled by the learner computing units for use in training the action selection neural network.

In some implementations, the calculation of the usage rate takes into account any trajectory that was stored in the replay at any point during the training of the action selection neural network, including trajectories that have been previously removed during the replay memory. That is, the variable N referenced in equation (1) can reference the number of trajectories that have been stored in the replay memory throughout the entire course of training the action selection neural network.

To determine the number of times that a trajectory in the replay memory has been sampled (i.e., to determine the values $$\{s_i\}_{i=1}^N$$

in equation (1)), the control system 202 can maintain a respective "counter" (i.e., scaler numerical variable) associated with each trajectory stored in the replay memory. When a trajectory is initially stored in the replay memory, the control system 202 can set the value of the counter to zero. Thereafter, each time the trajectory is sampled by a learner computing unit for use in training the action selection neural network 214, the control system 202 can increment the value of the counter, thereby tracking the number of times that the trajectory has been sampled.

As another example, the control system 202 can determine the usage rate to be given by the value of a "usage counter." The usage counter can be represented, e.g., as an integer numerical value. The control system 202 can decrement the usage counter once each time a new trajectory is stored in the replay memory, and the control system 202 can increment the counter once each time a trajectory is sampled from the replay memory.

The control system 202 can continuously monitor the usage rate 210, e.g., by computing the usage rate each time that an actor computing unit requests to store one or more trajectories in the replay memory, and each time that a learner computing unit requests to sample one or more trajectories from the replay memory.

Generally, the value of the usage rate 210 can vary dynamically over time due to a variety of factors. For example, the usage rate 210 can increase as a result of one or more actor computing units being taken offline, e.g., as the result of a hardware or software failure. As another example, the usage rate 210 can decrease as a result of one or more of the learner computing units being taken offline, e.g., as the result of a hardware or software failure. As another example, the usage rate can fluctuate unpredictably because some or all of the computing units of the training system 200 can alternate between performing the operations of the training system and performing other unrelated computing tasks. For example, the computing units of the training system 200 can be part of a larger data center that is performing a high volume of computing operations which are not limited to the operations of the training system 200. Certain computing units performing the operations of the training system 200 can be temporarily re-tasked to perform other computing operations that are assigned a higher priority in the data center, before returning to performing the operations of the training system 200.

In addition to monitoring the usage rate 210 of the replay memory 208, the control system 202 maintains data defining a range of allowable usage rates. The range of allowable usage rates can be defined by: (i) a lower endpoint, i.e., indicating a lowest allowable usage rate, and (ii) an upper endpoint, indicating a highest allowable usage rate. For example, if the usage rate is determined in accordance with equation (1), then the range of allowable usage rates can be, e.g., [1, 4], [4, 10], [100, 1000], or another appropriate range. As another example, if the usage rate is determined by the value of a usage counter (as described above), then the range of allowable usage rates can be, e.g., [−2500, 5000], [−5000, 100000], [−10000, 20000], or any other appropriate range. The range of allowable usage rates can be specified, e.g., by a user of the training system 200.

The control system 202 is configured to perform operations that continuously maintain the usage rate 210 of the replay memory 208 within the range of allowable usage rates. Examples of operations that can be performed by the control system 202 to cause the usage rate 210 of the replay memory 208 to stay within the range of allowable usage rates are described next.

In some implementations, whenever an actor computing unit requests to store one or more trajectories generated by the actor computing unit in the replay memory, the control system 202 can determine the usage rate of the replay memory that would result from storing the trajectories in the replay memory. For example, the control system 202 can determine the usage rate of the replay memory in accordance with equation (1) if the trajectories generated by the actor computing unit were stored in the replay memory but sampled zero (0) times. As another example, the control system 202 can determine the usage rate of the replay memory that would result from storing the trajectories in the replay memory as the result of decrementing the usage counter once for each trajectory. In response to determining that the usage rate 210 of the replay memory 208 (e.g., that would result from storing the trajectories in the replay memory) is below the lower endpoint of the range of allowable usage rates, the control system 202 can prevent one or more of the actor computing units from generating new trajectories. That is, the control system 202 can "block" one or more of the actor computing units. The control system 202 can block an actor computing unit, e.g., by transmitting instructions to the actor computing unit to cease selecting actions to be performed by the agent being controlled by the actor computing unit. In addition to blocking the actor computing unit, the control system 202 can prevent the trajectories generated by the actor computing unit from being stored in the replay memory.

An actor computing unit that is blocked can be idle, or it can be re-tasked to perform other computations. Generally, blocking an actor computing unit is a reversible operation, i.e., such that the control system 202 can later "activate" the actor computing unit to cause it to resume generating trajectories for use in training the action selection neural network 214, as will be described in more detail below. Blocking one or more actor computing units tends to increase the usage rate of the replay memory, i.e., because it causes fewer trajectories to be generated and stored in the replay memory.

Figure 3A:
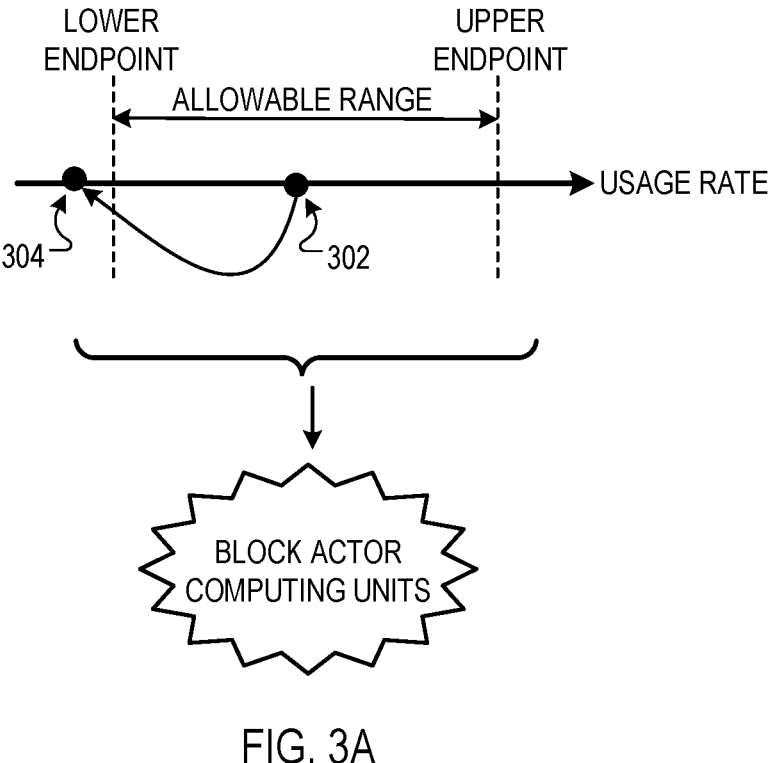
FIG. 3A illustrates an example of a training system blocking one or more actor computing units in response to determining that the current usage rate is below lower endpoint of the range of the allowable usage rates.

FIG. 3A illustrates an example of the usage rate of the replay memory decreasing from an initial value 302 that is within the range of allowable usage rates to a subsequent value 304 that is outside the range of allowable usage rates, in particular, that is below the lower endpoint of the range of allowable usage rates. In response to determining that storing one or more trajectories generated by an actor computing unit in the replay memory would cause the usage rate to decrease below the lower endpoint of the range of allowable usage rates, the control system 202 can block the actor computing unit.

In some implementations, whenever a learner computing unit requests to sample one or more trajectories from the replay memory, the control system 202 can determine the usage rate of the replay memory that would result from the learner computing unit sampling the trajectories from the replay memory. For example, the control system 202 can determine the usage rate of the replay memory that would result from the learner computing unit sampling the trajectories from the replay memory in accordance with equation (1). As another example, the control system 202 can determine the usage rate of the replay memory that would result from the learner computing unit sampling the trajectories from the replay memory as the result of incrementing the usage counter once for each trajectory. In response to determining that the current usage rate 210 of the replay memory (e.g., that would result from the learner computing unit sampling the trajectories from the replay memory) is higher than the upper endpoint of the range of allowable usage rates, the control system 202 can prevent the learner computing unit from sampling the trajectories from the replay memory for use in training the action selection neural network 214. That is, the control system 202 can "block" the learner computing unit. The control system 202 can block a learner computing unit, e.g., by transmitting instructions to the learner computing unit to cease sampling trajectories from the replay memory for use in training the action selection neural network 214.

A learner computing unit that is blocked can be idle, or it can be re-tasked to perform other computations. Generally, blocking a learner computing unit is a reversible operation, i.e., such that the control system 202 can later "activate" the learner computing unit to cause it to resume sampling trajectories from the replay memory 208 for use in training the action selection neural network 214, as will be described in more detail below. Blocking one or more of the learner computing units tends to decrease the usage rate of the replay memory, i.e., because it causes fewer trajectories to be sampled from the replay memory.

Figure 3B:
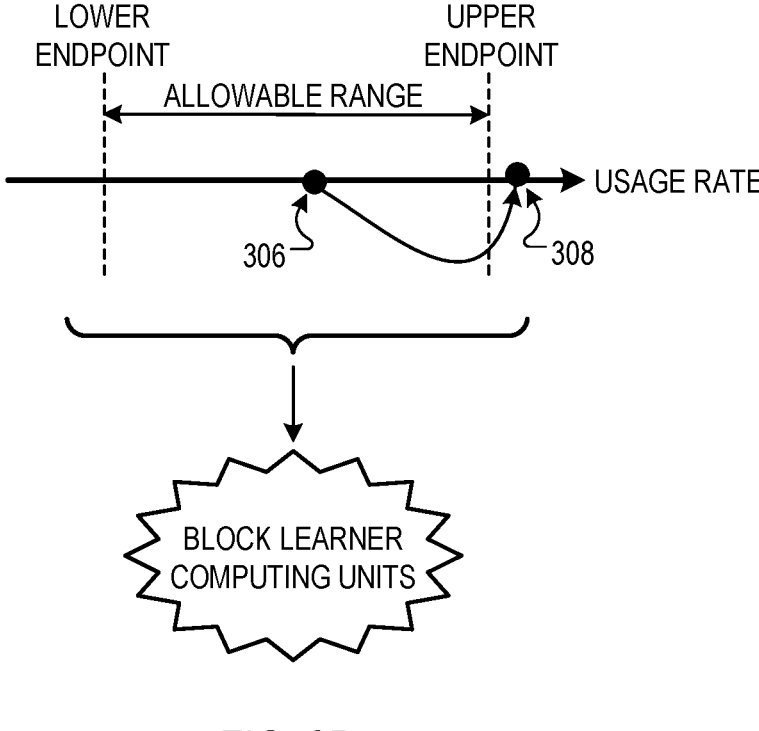
FIG. 3B illustrates an example of a training system blocking one or more learner computing units in response to determining that the current usage rate is above the upper endpoint of the range of allowable usage rates.

FIG. 3B illustrates an example of the usage rate of the replay memory increasing from an initial value 306 that is within the range of allowable usage rates to a subsequent value 308 that is outside the range of allowable usage rates, in particular, that is above the upper endpoint of the range of allowable usage rates. In response to determining that a learner computing unit sampling one or more trajectories from the replay memory would cause the usage rate of the replay memory to increase above the upper endpoint of the range of allowable usage rates, the control system 202 can block the learner computing unit.

In some implementations, in response to determining that the current usage rate 210 of the replay memory 208 is below the lower endpoint of the range of allowable usage rates, the control system 202 can "activate" one or more learner computing units. Activating a learner computing unit refers to causing the learner computing unit to start sampling trajectories from the replay memory for use in training the action selection neural network. In some cases, the control system 202 can activate learner computing units that were "inactive" (i.e., not sampling trajectories from the replay memory for use in training the action selection neural network 214) as a result of being previously blocked by the control system 202 (as described above). Activating one or more learner computing units tends to increase the usage rate of the replay memory, i.e., because it causes more trajectories to be sampled from the replay memory for use in training the action selection neural network.

In some implementations, in response to determining that the current usage rate 210 of the replay memory 208 is below the lower endpoint of the range of allowable usage rates, the control system 202 can both: (i) block one or more actor computing units (as described above), and (ii) activate one or more learner computing units (as described above).

In some implementations, in response to determining that the current usage rate 210 of the replay memory 208 is greater than the upper endpoint of the range of allowable usage rates, the control system can "activate" one or more actor computing units. Activating an actor computing unit refers to causing the actor computing unit to start generating new trajectories to be stored in the replay memory. In some cases, the control system 202 can activate actor computing units that were "inactive" (i.e., not generating trajectories to be stored in the replay memory) as a result of being previously blocked by the control system 202 (as described above). Activating one or more actor computing units tends to decrease the usage rate of the replay memory, i.e., because it causes more trajectories to be generated and stored in the replay memory.

In some implementations, in response to determining that the current usage rate 210 of the replay memory 208 is greater than the upper endpoint of the range of allowable usage rates, the control system can both: (i) block one or more learner computing units (as described above), and (ii) activate one or more actor computing units (as described above).

When the system determines that one or more actor or learner computing units should be blocked or activated, the system can select which actor or learner computing units to block or activate in any of a variety of ways. For example, in response to determining that an actor computing unit is attempting to store a trajectory into the replay memory that would cause the usage rate to fall below the lower bound of the allowable range of usage rates, then the control system can select that actor computing unit to be blocked. As another example, in response to determining that a learner computing unit is attempting to sample a trajectory from the replay memory that would cause the usage rate to increase above an upper bound of the allowable range of usage rates, then the control system can select that learner computing unit to be blocked. As another example, in response to determining that one or more actor or learner computing units should be blocked or activated, the control system can randomly which select which particular actor or learner computing units to block or activate.

In some cases, in response to determining that the usage rate of the replay memory is outside the range of allowable usage rates, the control system 202 can block multiple actor or learner computing units. For example, the control system 202 can block a predefined number (e.g., one (1), three (3), five (5), or another other appropriate number) of actor or learner computing units at regular intervals (e.g., every 30 seconds, 60 seconds, 90 seconds, or at any other appropriate interval), until the usage rate of the replay memory returns to within the range of allowable usage rates.

Maintaining the usage rate 210 of the replay memory 208 within the range of allowable usage rates can reduce consumption of computational resources (e.g., memory and computing power) by the training system 200 while increasing the performance of the action selection neural network 214.

For example, the usage rate of the replay memory being below the lower endpoint of the allowable range of usage rates can indicate that the trajectories being stored in the replay memory are being underutilized by the learner computing units. Put another way, the actor computing units may be generating a wastefully large number of trajectories that may be overwhelming the capacity of the learner computing units to fully use the generated trajectories during training of the action selection neural network. In this instance, the control system 202 can block one or more actor computing units, thereby reducing the number of generated trajectories without necessarily reducing the rate at which the action selection neural network can be trained to reach an acceptable level of performance. Moreover, by blocking one or more actor computing units, the control system 202 can reduce the consumption of computational resources during training of the action selection neural network and free up computing resources for other purposes.

As another example, the usage rate of the replay memory being above the upper endpoint of the allowable range of usage rates can indicate that the trajectories being stored in the replay memory are being over-utilized by the learner computing units. In particular, the learner computing units may be repeatedly training the action selection neural network on the same trajectories from the replay memory until the action selection neural network "over-fits" those trajectories. Over-fitting the trajectories in the replay memory can decrease the performance of an agent being controlled by the action selection neural network in performing a task, e.g., by causing the action selection neural network to "forget" previously learned information in favor of "memorizing" the current contents of the replay memory. In this instance, the control system 202 can block one or more of the learner computing units, which can both reduce consumption of computational resources (i.e., by preventing the learner computing units from operating), and also improve the performance of the action selection neural network (e.g., by reducing over-fitting).

The learner computing units of the training system 200 are not limited to training an action selection neural network. For example, the learner computing units of the training system 200 can sample trajectories from the replay memory for use in training an "environment model." An environment model can be configured to process an input that includes: (i) a representation of an observation of the environment at a time step, and (ii) a representation of an action performed by the agent at the time step, to generate an output that characterizes a predicted state of the environment at the next time step. For example, the environment model can generate an output that defines a predicted observation characterizing the state of the environment at the next time step. The environment model can be implemented as any appropriate machine learning model, e.g., a neural network model or random forest model, and the learner computing units can train the environment model on trajectories sampled from the replay memory using any appropriate machine learning training techniques, e.g., supervised learning techniques.

The memory management system 400 receives the trajectories generated by the actor computing units and implements an efficient scheme for storing the received trajectories in the replay memory 208. An example of a memory management system is described in more detail next with reference to FIG. 4.

Figure 4:
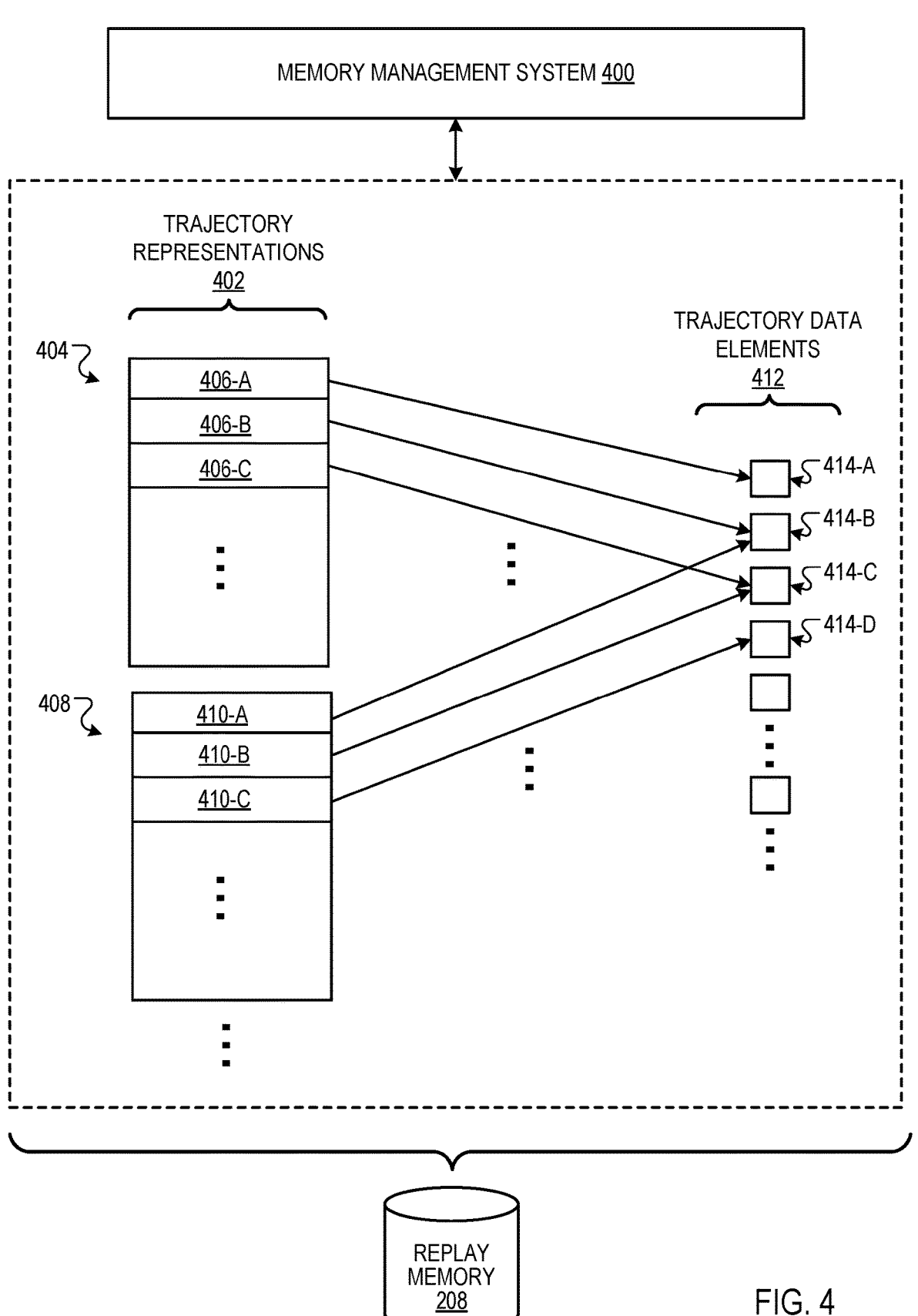
FIG. 4 shows an example memory management system.

FIG. 4 shows an example memory management system 400. The memory management system 400 is an example of a system implemented as computer programs on one or more computers in one or more locations in which the systems, components, and techniques described below are implemented.

The memory management system 400 receives "original" trajectories generated by the actor computing units, and stores the original trajectories in the replay memory 400. A trajectory characterizes interaction of an agent with an environment over a sequence of time steps and can represent, for each time step: (i) an observation of the state of the environment at the time step, (ii) an action performed by the agent at the time step, and (iii) a reward received by the agent at the time step. Trajectories can represent other information as well, e.g., the hidden state of a recurrent action selection neural network at each time step, a set of action scores generated by the action selection neural network at each time step, or both.

To store an original trajectory in the replay memory, the memory management system partitions the original trajectory into a collection of "trajectory data elements" 412, and then stores each trajectory data element in a respective slot in the replay memory. (A "slot" can refer to, e.g., a logical data storage space in the replay memory). In some implementations, each trajectory data element 412 corresponds to a respective time step in the original trajectory and includes all the data represented in the original trajectory for that time step, e.g., the observation, action, and reward for that time step. In other implementations, each trajectory data element 412 corresponds to a respective observation, action, or reward for a respective time step in the original trajectory. Optionally, the memory management system 400 can compress each trajectory data element 412 before storing it in a respective slot in the replay memory using any appropriate compression algorithm, e.g., an entropy encoding compression algorithm.

Generally, the learner computing units of the training system are configured to sample trajectories of a predefined "target" length from the replay memory, while the trajectories generated by the actor computing units have a longer length. (The length of a trajectory refers to the number of time steps represented by the trajectory). For example, the learner computing units can be configured to sample trajectories with a target length of 10 time steps, while the trajectories generated by the actor computing units can have lengths of over 1000 time steps.

To account for the discrepancy between the length of an "original" trajectory generated by an actor computing unit and the target trajectory length, the memory management system can subdivide the original trajectory into multiple overlapping "new" trajectories that each have the target length. For example, if the target trajectory length is 10, then the memory management system can subdivide the original trajectory into a first "new" trajectory corresponding to time steps [1, 10], a second "new" trajectory corresponding to time steps [2, 11], a third "new" trajectory corresponding to time steps [3, 12], etc.

The memory management system 400 can then generate a respective trajectory representation 402 for each new trajectory. Each trajectory representation can be represented as a sequence of "pointers," where each pointer references a memory address of a slot that stores a corresponding data element of the original trajectory. For example, the trajectory representation 404 includes a first pointer 406-A that points to data element 414-A of the original trajectory, a second pointer 406-B that points to data element 414-B of the original trajectory, a third pointer 406-C that points to data element 414-C of the original trajectory, etc. As another example, the trajectory representation 408 includes a first pointer 410-A that points to data element 414-B of the original trajectory, a second pointer 410-B that points to data element 414-C of the original trajectory, a third pointer 410-C that points to data element 414-D of the original trajectory, etc.

The memory management system 400 stores the trajectory representations 402 defining the new trajectories in the replay memory, i.e., in addition to the trajectory data elements 412 representing the original trajectory. Representing each new trajectory as a sequence of pointers referencing data elements of the original trajectory allows new trajectories to be represented in the replay memory using significantly less storage space than would be required, e.g., for storing a separate sequence of trajectory data elements representing each new trajectory.

To sample a trajectory from the replay memory, a learner computing unit samples a trajectory representation 402 from the set of trajectory representations stored in the replay memory, where each trajectory representation is defined by a sequence of pointers referencing corresponding trajectory data elements stored in the replay memory. After sampling a trajectory representation, the learner computing unit obtains the trajectory data elements defining the trajectory by reading the trajectory data elements from the slots in the replay memory that are referenced by the sequence of pointers of the trajectory representation.

In addition to storing trajectory representations 402 and trajectory data elements 412 in the replay memory 208, the memory management system 400 can coordinate the removal of trajectory representations 402 and trajectory data elements 412 from the replay memory 208. A few examples of coordinating the removal of trajectory representations 402 and trajectory data elements 412 from the replay memory 208 are described next.

In one example, if an actor computing unit provides a trajectory to be stored in the replay memory 208 when the replay memory is full, the memory management system 400 can identify the oldest trajectory data elements stored in the replay memory (i.e., the trajectory data elements that were generated least recently). The memory management system 400 can remove any trajectory representations that include pointers that point to the oldest trajectory data elements, and then overwrite the oldest trajectory data elements with the provided trajectory data elements.

In another example, the memory management system 400 can remove any trajectory representations that have been sampled more than a predefined threshold number of times (e.g., 10 times) by the learner computing units.

In another example, the memory management system 400 can identify and remove any trajectory data elements 412 based on the number of pointers (i.e., from trajectory representations stored in the replay memory 208) that reference the trajectory data elements. In some implementations, the memory management system 400 can identify and remove any trajectory data elements 412 stored in the replay memory 208 that are not referenced by pointers from any trajectory representations, e.g., because all the trajectory representations that referenced the data element have previously been removed. In some implementations, the trajectory data elements 412 stored in the replay memory can be understood as being grouped into "chunks" of multiple trajectory data elements. In these implementations, the memory management system 400 can identify and remove chunks without any trajectory data elements that are referenced by pointers from trajectory representations.

Figure 5:
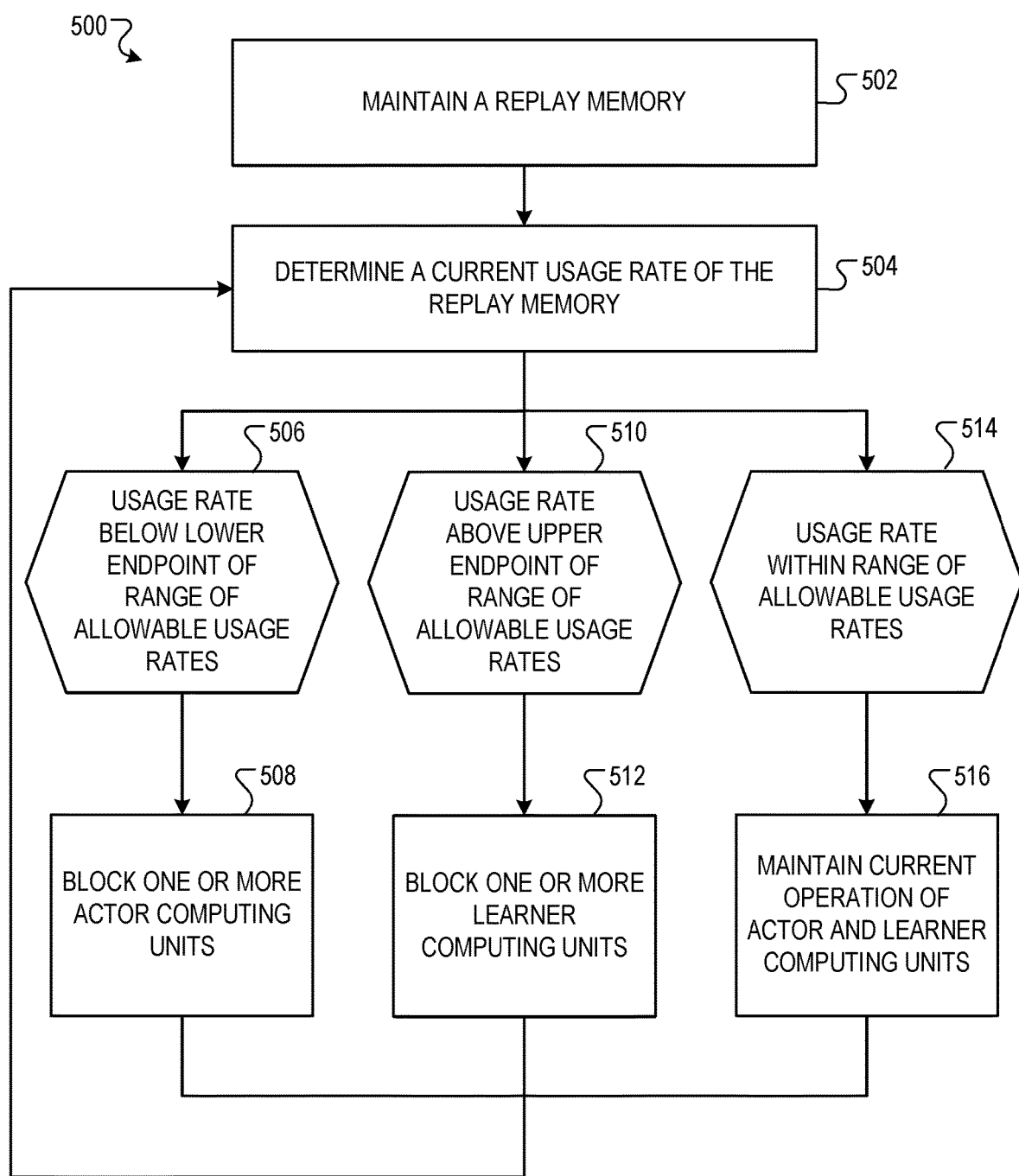
FIG. 5 is a flow diagram of an example process for training an action selection neural network used to select actions to be performed by an agent interacting with an environment.

FIG. 5 is a flow diagram of an example process 500 for training an action selection neural network used to select actions to be performed by an agent interacting with an environment. For convenience, the process 500 will be described as being performed by a system of one or more computers located in one or more locations. For example, a training system, e.g., the training system 200 of FIG. 2, appropriately programmed in accordance with this specification, can perform the process 500.

The system maintains a replay memory that stores trajectories generated by a set of multiple actor computing units (502). Each actor computing unit is configured to control interaction of a respective instance of the agent with a respective instance of the environment to generate trajectories for use in training the action selection neural network.

Each of one or more learner computing units is configured to train the action selection neural network on trajectories sampled from the replay memory.

The system determines a usage rate of the replay memory representing how frequently trajectories in the replay memory have been sampled for use in training the action selection neural network (504). The system can determine the usage rate of the replay memory, e.g., in response to a request from an actor computing unit to store one or more trajectories in the replay memory, or in response to a request from a learner computing unit to sample one or more trajectories from the replay memory. The system can determine the usage rate of the replay memory, e.g., as being the usage rate that would result from performing the requested operation of the actor or learner computing unit. The system can determine the usage rate, e.g., based on a ratio between: (i) a sum of a respective number of times that each trajectory that has been stored in the replay memory has been sampled by the learner computing units for use in training the action selection neural network, and (ii) the number of trajectories that have been stored in the replay memory, e.g., as described with reference to equation (1).

In response to determining that the current usage rate of the replay memory is below a lower endpoint of the allowable range of usage rates (506), the system can prevent each of one or more of the actor computing units from generating trajectories (508). For example, the system can block an actor computing unit that has requested to store one or more trajectories in the replay memory, and further, can prevent those trajectories from the being stored in the replay memory (e.g., to maintain the usage rate within the range of allowable usage rates). Optionally, the system can also determine that one or more learner computing units that were previously prevented from sampling trajectories from the replay memory should resume sampling trajectories from the replay memory for use in training the action selection neural network. The system can then return to step 504.

In response to determining that the usage rate of the replay memory is above an upper endpoint of the allowable range of usage rates (510), the system can prevent each of one or more of the learner computing units from sampling trajectories from the replay memory for use in training the action selection neural network (512). For example, the system can block a learner computing unit that has requested to sample one or more trajectories from the replay memory. Optionally, the system can also determine that one or more actor computing units that were previously prevented from generating trajectories should resume generating trajectories. The system can then return to step 504.

In response to determining that the usage rate of the replay memory is within the range of allowable usage rates (514), the system can maintain the current operation of the actor and learner computing units (516). The system can then return to step 504.

FIG. 6 is a flow diagram of an example process 600 for representing a trajectory generated by an actor computing unit in a replay memory. For convenience, the process 600 will be described as being performed by a system of one or more computers located in one or more locations. For example, a memory management system, e.g., the memory management system 400 of FIG. 4, appropriately programmed in accordance with this specification, can perform the process 600.

The system receives an original trajectory generated by an actor computing unit (602). The learner computing units are configured to sample trajectories of a predefined target length from the replay memory, and the length of the original trajectory generated by the actor computing unit is longer than the target length. For example, the target trajectory length can be 10 time steps, while the length of the original trajectory generated by the actor computing unit can be over 1000 time steps.

The system stores a set of trajectory data elements representing the original trajectory in respective slots of the replay memory (604). Each of the trajectory data elements representing the original trajectory can correspond to a respective time step in the original trajectory and can include data representing interaction of an agent with an environment at the time step. For example, each trajectory data element can include data representing: (i) an observation of the environment at the corresponding time step, (ii) an action performed by the agent at the corresponding time step, and (iii) a reward received by the agent at the corresponding time step. Optionally, the system can compress each trajectory data element representing the original trajectory before storing the trajectory data element in a slot in the replay memory.

The system subdivides the original trajectory into a set of multiple overlapping new trajectories (606). For example, if the target trajectory length is 10, then the system can subdivide the original trajectory into a first "new" trajectory corresponding to time steps [1,10], a second "new" trajectory corresponding to time steps [2,11], a third "new" trajectory corresponding to time steps [3,12], etc. In some cases, a new trajectory (i.e., that the system sub-divides from the original trajectory) can be defined as including, for one or more time steps, only a proper subset of the trajectory data elements of the original trajectory for the time step. For example, a new trajectory can be defined as including only the observation from a first time step in the original trajectory, both the observation and the action from a second time step in the original trajectory, only the rewards from the third and fourth time steps in the original trajectory, and so on.

The system instantiates a respective trajectory representation of each new trajectory in the replay memory as a sequence of pointers that each point to a respective slot of the replay memory storing a trajectory data element of the original trajectory (608). FIG. 4 illustrates an example of trajectory representations as sequences of pointers that reference slots of the repay memory storing trajectory data elements.

The system makes each of the trajectory representations representing the new trajectories available to the learner computing units for sampling from the replay memory (610). After sampling a trajectory representation from the replay memory, a learner computing unit can obtain the trajectory data elements defining the trajectory by reading the trajectory data elements from the slots in the replay memory that are referenced by the sequence of pointers of the trajectory representation.

This specification uses the term "configured" in connection with systems and computer program components. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory storage medium for execution by, or to control the operation of, data processing apparatus. The computer storage medium can be a machine-readable storage device, a machine-readable storage substrate, a random or serial access memory device, or a combination of one or more of them. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus.

The term "data processing apparatus" refers to data processing hardware and encompasses all kinds of apparatus, devices, and machines for processing data, including by way of example a programmable processor, a computer, or multiple processors or computers. The apparatus can also be, or further include, special purpose logic circuitry, e.g., an FPGA (field programmable gate array) or an ASIC (application-specific integrated circuit). The apparatus can optionally include, in addition to hardware, code that creates an execution environment for computer programs, e.g., code that constitutes processor firmware, a protocol stack, a database management system, an operating system, or a combination of one or more of them.

A computer program, which may also be referred to or described as a program, software, a software application, an app, a module, a software module, a script, or code, can be written in any form of programming language, including compiled or interpreted languages, or declarative or procedural languages; and it can be deployed in any form, including as a stand-alone program or as a module, component, subroutine, or other unit suitable for use in a computing environment. A program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a data communication network.

In this specification the term "engine" is used broadly to refer to a software-based system, subsystem, or process that is programmed to perform one or more specific functions. Generally, an engine will be implemented as one or more software modules or components, installed on one or more computers in one or more locations. In some cases, one or more computers will be dedicated to a particular engine; in other cases, multiple engines can be installed and running on the same computer or computers.

The processes and logic flows described in this specification can be performed by one or more programmable computers executing one or more computer programs to perform functions by operating on input data and generating output. The processes and logic flows can also be performed by special purpose logic circuitry, e.g., an FPGA or an ASIC, or by a combination of special purpose logic circuitry and one or more programmed computers.

Computers suitable for the execution of a computer program can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. The central processing unit and the memory can be supplemented by, or incorporated in, special purpose logic circuitry. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser. Also, a computer can interact with a user by sending text messages or other forms of message to a personal device, e.g., a smartphone that is running a messaging application, and receiving responsive messages from the user in return.

Data processing apparatus for implementing machine learning models can also include, for example, special-purpose hardware accelerator units for processing common and compute-intensive parts of machine learning training or production, i.e., inference, workloads.

Machine learning models can be implemented and deployed using a machine learning framework, e.g., a TensorFlow framework.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface, a web browser, or an app through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network (LAN) and a wide area network (WAN), e.g., the Internet.

The computing system can include clients and servers. A client and server are generally remote from each other and typically interact through a communication network. The relationship of client and server arises by virtue of computer programs running on the respective computers and having a client-server relationship to each other. In some embodiments, a server transmits data, e.g., an HTML page, to a user device, e.g., for purposes of displaying data to and receiving user input from a user interacting with the device, which acts as a client. Data generated at the user device, e.g., a result of the user interaction, can be received at the server from the device.

While this specification contains many specific implementation details, these should not be construed as limitations on the scope of any invention or on the scope of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially be claimed as such, one or more features from a claimed combination can in some cases be excised from the combination, and the claimed combination may be directed to a subcombination or variation of a subcombination.

Similarly, while operations are depicted in the drawings and recited in the claims in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A system for training an action selection neural network used to select actions to be performed by an agent to interact with an environment, the system comprising:

a plurality of actor computing units, wherein each actor computing unit is configured to control interaction of a respective instance of the agent with a respective instance of the environment to generate trajectories for use in training the action selection neural network;

a replay memory that stores trajectories generated by the plurality of actor computing units;

one or more learner computing units, wherein each learner computing unit is configured to train the action selection neural network on trajectories selected from the replay memory; and a control system that is configured to autonomously:

determine a usage rate of the replay memory characterizing how frequently trajectories from the replay memory have been sampled for use in training the action selection neural network; and in response to determining that the usage rate of the replay memory is outside a range of allowable usage rates:

prevent each of one or more of the actor computing units from generating trajectories, or prevent each of one or more of the learner computing units from sampling trajectories from the replay memory for use in training the action selection neural network.

2. The system of claim 1, wherein determining the usage rate of the replay memory characterizing how frequently trajectories from the replay memory have been sampled for use in training the action selection neural network comprises:

determining the usage rate of the replay memory based on: (i) a respective number of times that each trajectory that has been stored in the replay memory has been sampled by learner computing unit for use in training the action selection neural network, and (ii) a number of trajectories that have been stored in the replay memory.

3. The system of claim 2, wherein determining the determining the usage rate of the replay memory based on: (i) a respective number of times that each trajectory that has been stored in the replay memory has been sampled by the learner computing units for use in training the action selection neural network, and (ii) a number of trajectories that have been stored in the replay memory, comprises:

determining the usage rate of the replay memory based on a ratio between: (i) a sum of the respective number of times that each trajectory that has been stored in the replay memory has been sampled by the learner computing units for use in training the action selection neural network, and (ii) the number of trajectories that have been stored in the replay memory.

4. The system of claim 1, wherein the control system is configured to:

determine that the usage rate of the replay memory is outside the range of allowable usage rates based on the usage rate of the replay memory being below a lower endpoint of the allowable range of usage rates; and prevent each of one or more of the actor computing units from generating trajectories.

5. The system of claim 1, wherein determining the usage rate of the replay memory characterizing how frequently trajectories from the replay memory have been sampled for use in training the action selection neural network comprises:

receiving a request from an actor computing unit to store one or more trajectories generated by the actor computing unit in the replay memory; and determining the usage rate of the replay memory as a usage rate that would result from storing the one or more trajectories generated by the actor computing unit in the replay memory.

6. The system of claim 5, wherein the control system is configured to:

prevent the actor computing unit from storing the one or more trajectories generated by the actor computing unit the replay memory.

7. The system of claim 1, wherein the control system is configured to:

determining that the usage rate of the replay memory is outside the range of allowable usage rates based on the usage rate of the replay memory being above an upper endpoint of the allowable range of usage rates; and preventing each of one or more of the learner computing units from sampling trajectories from the replay memory for use in training the action selection neural network.

8. The system of claim 1, wherein determining the usage rate of the replay memory characterizing how frequently trajectories from the replay memory have been sampled for use in training the action selection neural network comprises:

receiving a request from a learner computing unit to sample one or more trajectories from the replay memory; and determining the usage rate of the replay memory as a usage rate that would result from the learner computing unit sampling the one or more trajectories from the replay memory.

9. The system of claim 1, wherein the control system is configured to:

determining that the usage rate of the replay memory is outside the range of allowable usage rates based on the usage rate of the replay memory being below a lower endpoint of the allowable range of usage rates; and determining that one or more learner computing units that were previously prevented from sampling trajectories from the replay memory for use in training the action selection neural network should resume sampling trajectories from the replay memory for use in training the action selection neural network.

10. The system of claim 1, wherein the control system is configured to:

determining that the usage rate of the replay memory is outside the range of allowable usage rates based on the usage rate of the replay memory being above an upper endpoint of the allowable range of usage rates; and determining that one or more actor computing units that were previously prevented from generating trajectories should resume generating trajectories.

11. The system of claim 1, wherein the system comprises at least one hundred actor computing units.

12. The system of claim 1, wherein the control system continuously monitors the usage rate of the replay memory to maintain the usage rate of the replay memory within the range of allowable usage rates.

13. The system of claim 1, further comprising a memory management system that is configured to:

receive an original trajectory generated by an actor computing unit;

store a plurality of trajectory data elements representing the original trajectory in respective slots of the replay memory;

subdivide the original trajectory into a plurality of overlapping new trajectories;

instantiate a respective trajectory representation of each new trajectory in the replay memory as a sequence of pointers that each point to a respective slot of the replay storing a trajectory data element of the original trajectory; and make each of the trajectory representations representing the new trajectories available to the learner computing units for sampling from the replay memory.

14. The system of claim 13, wherein each of the plurality of trajectory data elements representing the original trajectory corresponds to a respective time step in the original trajectory and includes data representing interaction of an agent with an environment at the time step.

15. The system of claim 14, wherein each of the plurality of trajectory data elements includes data representing: (i) an observation of the environment at the corresponding time step, (ii) an action performed by the agent at the corresponding time step, and (iii) a reward received by the agent at the corresponding time step.

16. The system of claim 13, wherein storing the plurality of trajectory data elements representing the original trajectory in respective slots in the replay memory comprises:

compressing each of the plurality of trajectory data elements.

17. The system of claim 13, wherein the memory management subsystem is configured to:

track, for each trajectory data element stored in the replay memory, a respective number of times that a slot storing the trajectory data element is referenced by pointers from trajectory representations stored in the replay memory; and determine that one or more of the trajectory data elements stored in the replay memory should be removed from the replay memory based on the number of times that the slot storing the trajectory data element is referenced by pointers from trajectory representations stored in the replay memory.

18. The system of claim 17, wherein determining that one or more of the trajectory data elements stored in the replay memory should be removed from the replay memory comprises:

determining that any trajectory data element that is not referenced by any pointers from trajectory representations stored in the replay memory should be removed from the replay memory.

19. A method performed by one or more data processing apparatus for training an action selection neural network used to select actions to be performed by an agent interacting with an environment, the method comprising:

maintaining a replay memory that stores trajectories generated by a plurality of actor computing units, wherein each actor computing unit is configured to control interaction of a respective instance of the agent with a respective instance of the environment to generate trajectories for use in training the action selection neural network, wherein each of one or more learner computing units is configured to train the action selection neural network on trajectories selected from the replay memory;

determining a usage rate of the replay memory characterizing how frequently trajectories from the replay memory have been sampled for use in training the action selection neural network; and in response to determining that the usage rate of the replay memory is outside a range of allowable usage rates:

preventing each of one or more of the actor computing units from generating trajectories, or preventing each of one or more of the learner computing units from sampling trajectories from the replay memory for use in training the action selection neural network.

20. One or more non-transitory computer storage media storing instructions that when executed by one or more computers cause the one or more computers to perform operations for training an action selection neural network used to select actions to be performed by an agent interacting with an environment, the operations comprising:

maintaining a replay memory that stores trajectories generated by a plurality of actor computing units, wherein each actor computing unit is configured to control interaction of a respective instance of the agent with a respective instance of the environment to generate trajectories for use in training the action selection neural network, wherein each of one or more learner computing units is configured to train the action selection neural network on trajectories selected from the replay memory;

determining a usage rate of the replay memory characterizing how frequently trajectories from the replay memory have been sampled for use in training the action selection neural network; and in response to determining that the usage rate of the replay memory is outside a range of allowable usage rates:

preventing each of one or more of the actor computing units from generating trajectories, or preventing each of one or more of the learner computing units from sampling trajectories from the replay memory for use in training the action selection neural network.

* * * * *